(12) United States Patent
Yang (10) Patent No.: US 7,044,532 B2
(45) Date of Patent: May 16, 2006

(54) PROTECTIVE COVER FOR MOTOR VEHICLES

(75) Inventor: Ming-Shun Yang, Taipei (TW)

(73) Assignee: Formosa Saint Jose Corporation, Taipei (TW)

( * ) Notice: Subject to any disclaimer, the term of this patent is extended or adjusted under 35 U.S.C. 154(b) by 0 days.

(21) Appl. No.: 10/673,414

(22) Filed: Sep. 30, 2003

(65) Prior Publication Data

US 2006/0055200 A1    Mar. 16, 2006

(51) Int. Cl.
B60J 11/00    (2006.01)

(52) U.S. Cl. .............................. 296/136.07; 296/136.1; 150/166; 224/328

(58) Field of Classification Search ............. 296/139.1, 296/136.07, 136.13, 136.1; 150/166, 159, 150/167; 52/3, 2.16; 224/328
See application file for complete search history.

(56) References Cited

U.S. PATENT DOCUMENTS 3,024,717 A * 3/1962 Rozek ..................... 296/136.1
5,291,698 A * 3/1994 Rayner, Jr. ........................ 52/3
5,997,071 A * 12/1999 Mazzarelli ............. 296/136.07
6,412,851 B1 * 7/2002 Burks et al. ................... 296/98
6,491,335 B1 * 12/2002 Cohill .................... 296/136.07

* cited by examiner

*Primary Examiner*—Lori L. Coletta
(74) *Attorney, Agent, or Firm*—Troxell Law Office, PLLC (57) ABSTRACT

A protective cover including venting and fastening structures. The venting structure includes at least one vent located on the protective cover at a predetermined position, a hood loosely shielding the vent, and an outward opened V-sectioned bag located between the vent and the hood and having through holes spaced near an upper front edge to communicate with the vent, allowing residual heat and moisture to escape from the protective cover via the vent while external rainwater is stopped by the V-sectioned bag from invading the protective cover via the vent. The fastening structure includes a plurality of fixing hooks, each of which includes a plate for connecting to the protective cover via a tie-down loop and a hook provided on the plate for hooking to the vehicle or a hauler thereof, so that the protective cover is firmly tied to the vehicle or the trailer.

12 Claims, 8 Drawing Sheets

PRIOR ART

FIG. 3

PRIOR ART

FIG.4

PRIOR ART

FIG.5

PRIOR ART

FIG.6

PRIOR ART

PROTECTIVE COVER FOR MOTOR VEHICLES

FIELD OF THE INVENTION

The present invention relates to a protective cover for motor vehicles, and more particularly to a vehicle protective cover that includes enhanced waterproof venting structure and reliable fastening structure to provide effective protection of vehicle being covered.

BACKGROUND OF THE INVENTION

Generally, a motor vehicle, such as a motorcycle, a car, a boat, a personal water craft, etc., that is not in use and parked or placed outdoors is normally covered with a protective cover having a configuration matching with that of the vehicle, so that the vehicle is protected against dust, rainwater, snow, moisture, etc.

It is possible some parts of a vehicle, particularly an engine thereof, would have a residual heat once after the vehicle engine has been operated for a period of time. The protective cover covering the vehicle would also trap such residual heat and moisture in the air. It is necessary to remove the residual heat and moisture from inside of the protective cover to avoid adverse influences of such trapped residual heat and moisture on the vehicle. Therefore, the protective cover for motor vehicles must be made of a material that is not only waterproof but also air-permeable, and preferably provided at positions corresponding to, for example, the engine and other heat-producing parts of the vehicle with vents to timely dissipate the residual heat and moisture trapped in the protective cover.

Figure 1:
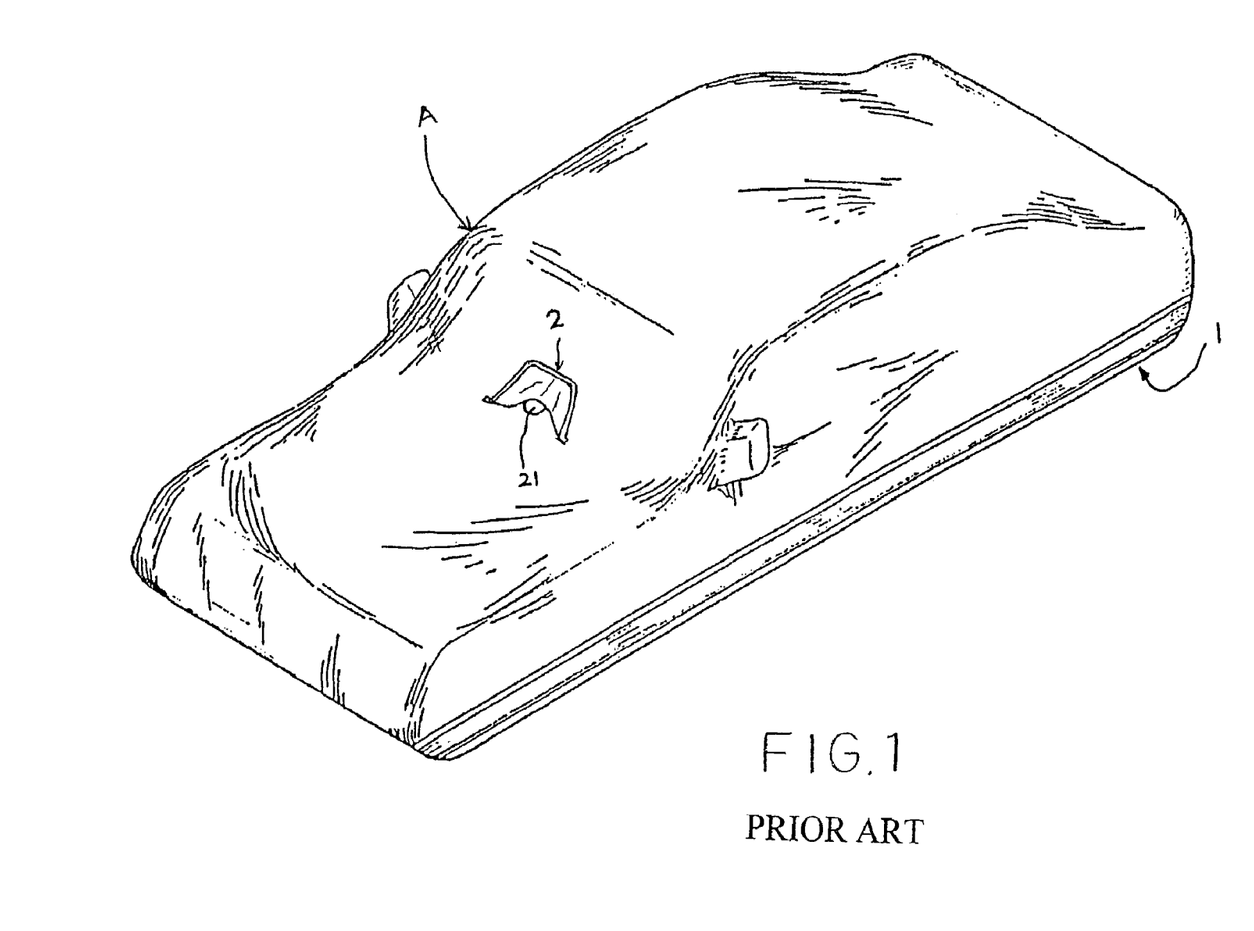
FIG. 1 is a schematic view showing a motor vehicle (PWC) being covered with a protective cover having a configuration corresponding to that of the motor vehicle.

FIG. 1 schematically shows a car (1) is covered with a protective cover (A) having a configuration corresponding to that of the car (1). It is shown that the protective cover (A) is provided at a suitable position with a venting structure (2) for heat and moisture trapped in the protective cover (A) to escape therefrom.

Figure 2:
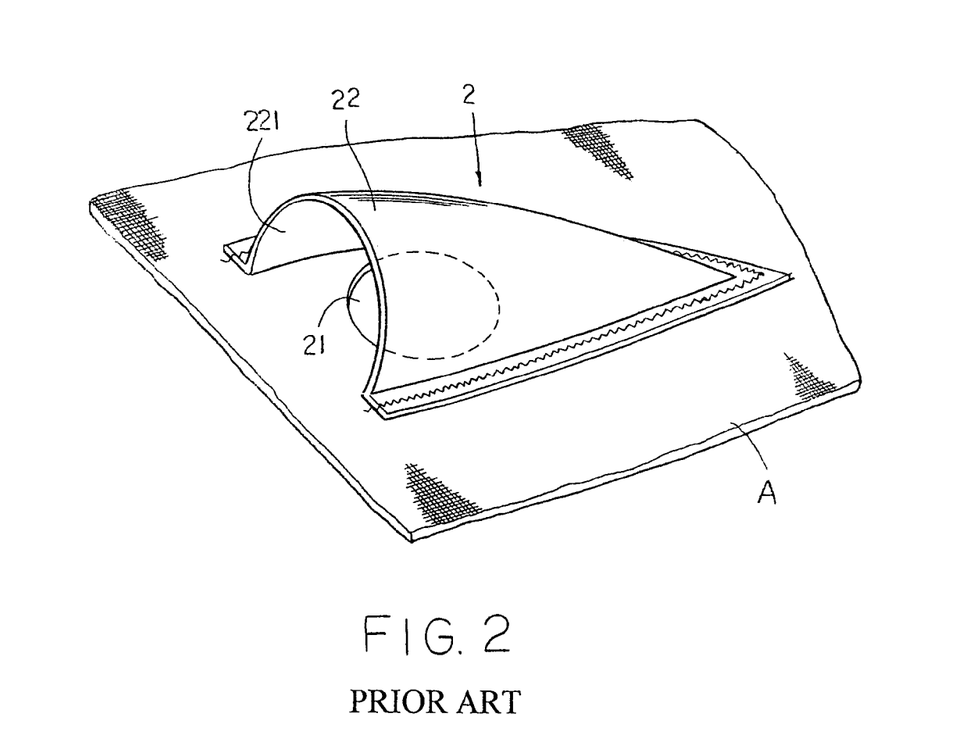
FIG. 2 is a fragmentary, enlarged perspective view of the protective cover of FIG. 1 showing a conventional venting structure thereof.
Figure 3:
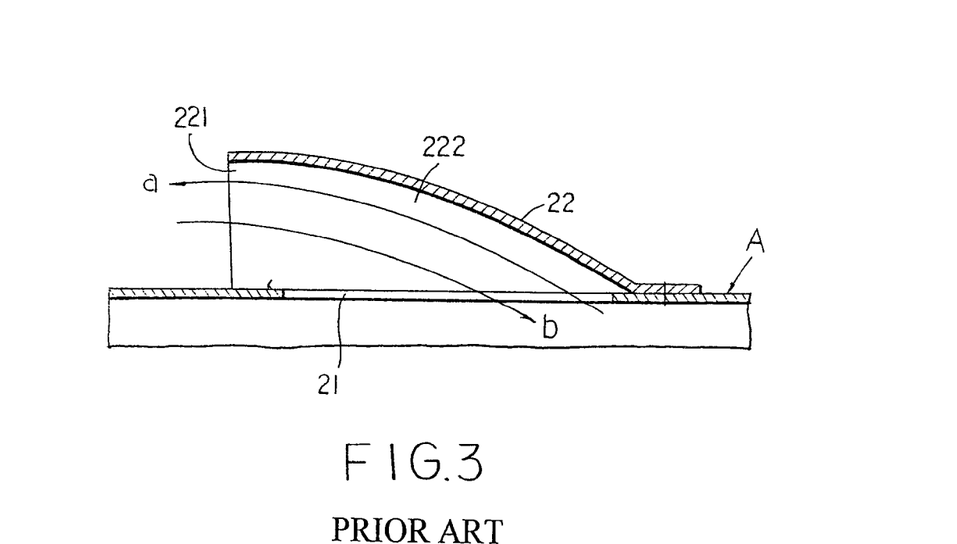
FIG. 3 is a cross sectional view of FIG. 2.

FIG. 2 is a fragmentary, enlarged perspective view of the protective cover (A) of FIG. 1 showing the conventional venting structure (2), and FIG. 3 is a sectioned side view of FIG. 2. As shown, the conventional venting structure (2) includes a vent (21) provided on the protective cover (A) at a desired position, such as an area corresponding to an engine (not shown) of the car vehicle (1), and a hood (22) sewed into the protective cover (A) to close three sides of the vent (21) with an opening (221) left as one side of the vent (21). That is, the hood (22) loosely covers the vent (21) to avoid the vent (21) from directly exposing to an external environment. The hood (22) is generally made of a rigid or a semi-rigid plastic material to have an arch configuration, so that a clear airflow passage (222) is formed and always maintained between the hood (22) and the vent (21). Any residual heat generated by the motor vehicle (1) and any moisture trapped in the protective cover (A) may escape from the protective cover (A) via the vent (21), the airflow passage (222), and the opening (221) of the hood (22), as indicated by the arrow "a".

In FIG. 3, the wide opening (221) and the clear airflow passage (222) allow the residual heat and the moisture to escape from the protective cover (A). Rainwater is also admitted into the protective cover (A) via the vent (21), as indicated by the arrow "b", when the protective cover (A) is subject to, for example, a rainstorm. That is, the existence of the vent (21) and the hood (22) prevents the protective cover (A) from being perfectly watertight in the rainstorm.

Figure 4:
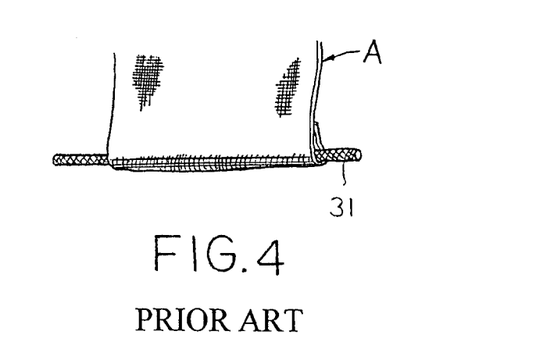
FIG. 4 is a fragmentary perspective view showing an example of a conventional fastening structure for the protective cover for motor vehicle.
Figure 5:
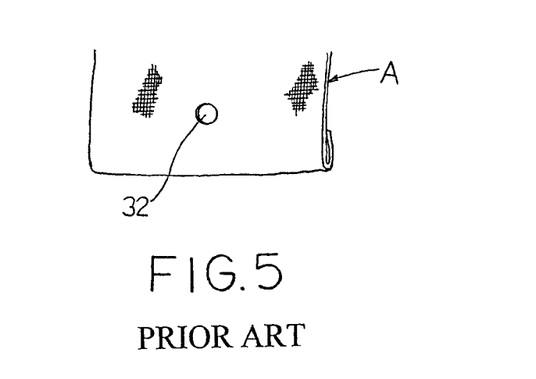
FIG. 5 is a fragmentary perspective view showing another example of the conventional fastening structure for the protective cover for motor vehicles.
Figure 6:
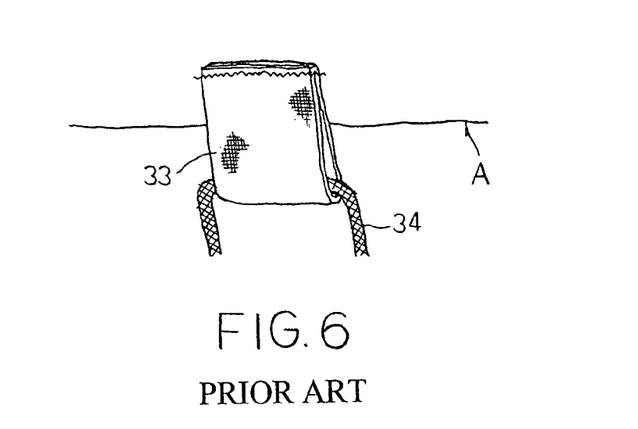
FIG. 6 is a fragmentary perspective view showing a further example of the conventional fastening structure for the protective cover for motor vehicles.

For the protective cover (A) to effectively protect the vehicle against rainwater, snow, etc., it is necessary to provide means for firmly tying the protective cover (A) to the vehicle being protected. In lacking of proper fastening or tying means, the protective cover (A) might very possibly become separated from the vehicle under strong wind and heavy rain and completely loses its intended function. Generally, the protective cover (A) for motor vehicles has three types of fastening structures. A first type of fastening structure for the protective cover (A) is shown in FIG. 4 and includes an elastic band (31) sewed to a lower edge of the whole protective cover (A). This type of fastening structure is workable under normal weather condition but not under strong wind and heavy rain. That is, the protective cover (A) with the elastic band (31) provided along the lower edge thereof would still be blown away or lifted by the strong wind. FIG. 5 shows the second type of fastening structure for the protective cover (A). Two grommets (32) are provided at two opposite sides of the protective cover (A) near two middle points thereof, so that a rope (not shown) may be extended through the grommets (32) to tie the protective cover (A) to the vehicle. Again, the provision of the grommets (32) does not effectively prevent the protective cover (A) from being blown off or lifted by strong wind. FIG. 6 shows the third type of fastening structure that is frequently found in the protective cover (A) for boats, and includes a plurality of tie-down loops (33) sewed to the lower edge of the protective cover (A). Ropes (34) are separately extended through the tie-down loops (33) for tying the cover (A) to the vehicle (1). However, it is very inconvenient and time-consuming to extend the ropes (34) through the tie-down loops (33) one by one. Therefore, it is desirable to develop an easily operable fastening structure for the vehicle protective cover, so that the latter could be well tightened on the vehicle being protected.

SUMMARY OF THE INVENTION

In one aspect of the present invention, there is provided as improved protective cover for motor vehicles by providing a substantially V-sectioned bag between a vent formed on the protective cover and a hood loosely shielding the vent. The V-sectioned bag has an outward opening and a plurality of holes spaced along an area close to an upper edge of the bag opening. The bag is made of a highly waterproof fabric or plastic sheet. While residual heat and moisture inside the protective cover may escape therefrom via the vent and the holes on the bag, external rainwater is prevented by the V-sectioned bag between the vent and the hood from entering into the protective cover via the vent, enabling the protective cover to be fully watertight.

In another aspect of the present invention, there is provided a reliable fastening structure for the protective cover for motor vehicles. The fastening structure includes a plurality of fixing hooks, each of which includes a plate, on which there are formed of a through hole for a tie-down loop sewed onto a lower edge of the protective cover to extend therethrough, and a hook for directly hooking onto the vehicle or a hauler or for holding a rope to tie the protective cover to the vehicle or the trailer. Therefore, the protective cover is prevented from being blown away or lifted under strong wind.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 7:
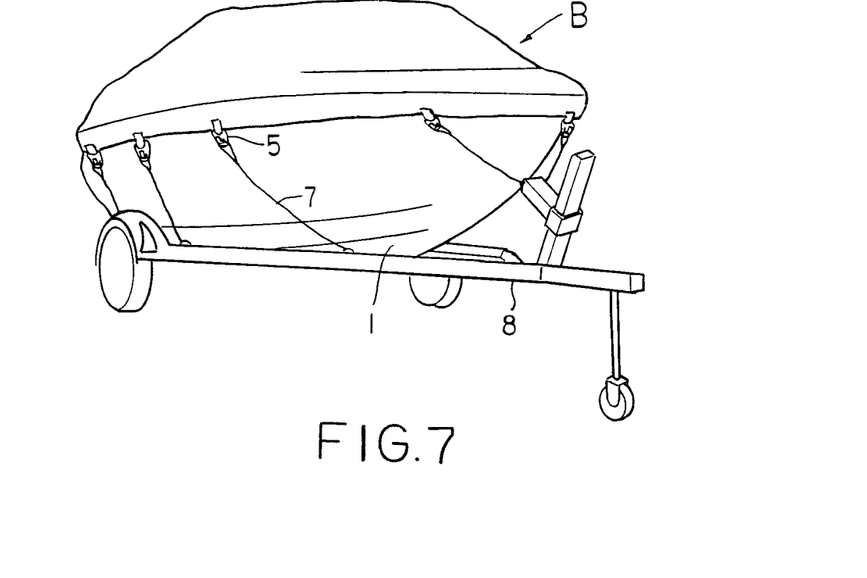
FIG. 7 is a schematic perspective view showing a motor vehicle is covered with a protective cover of the present invention.
Figure 8:
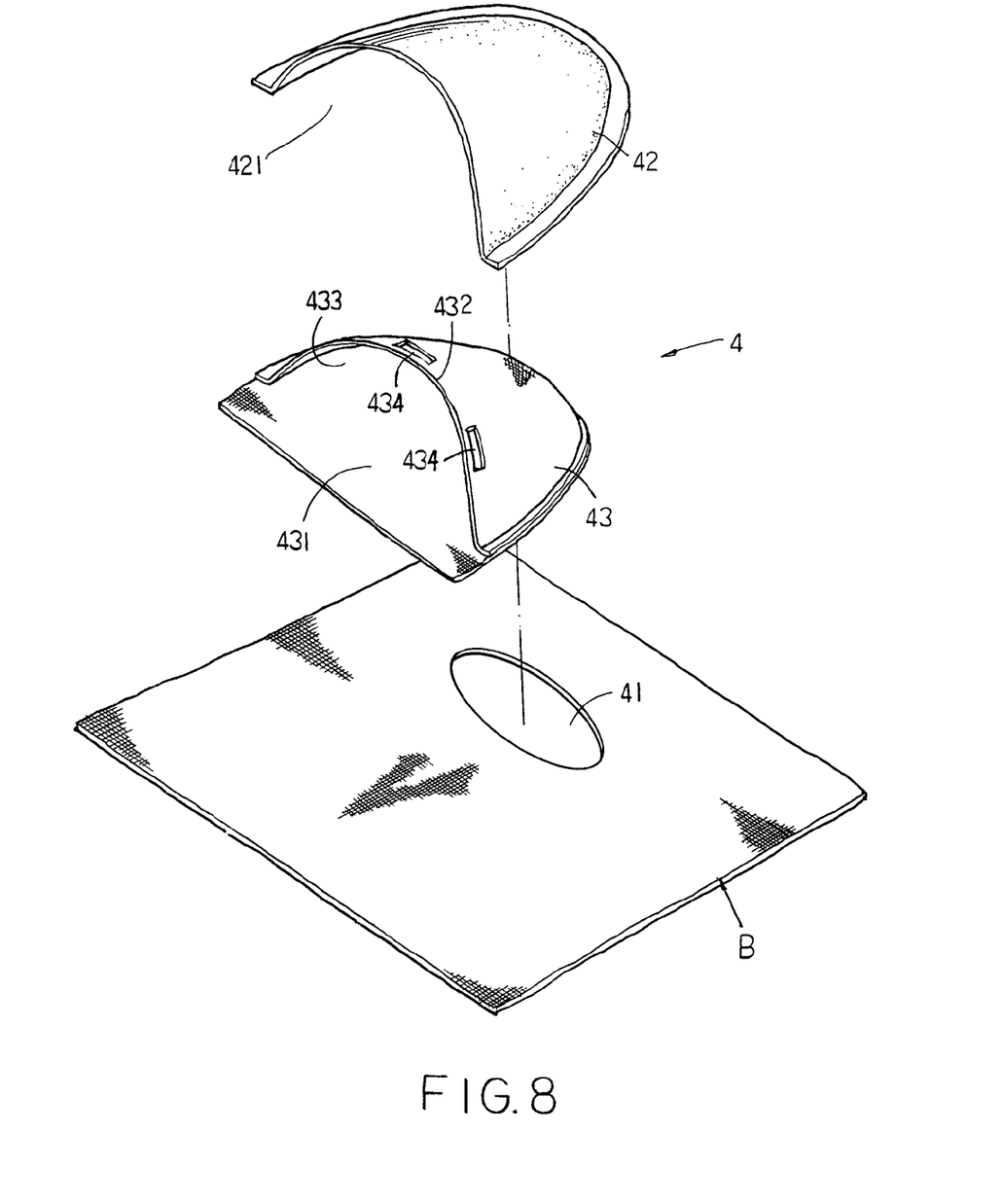
FIG. 8 is a fragmentary, enlarged, and exploded perspective view showing a first embodiment of a venting structure for the protective cover of the present invention.
Figure 9:
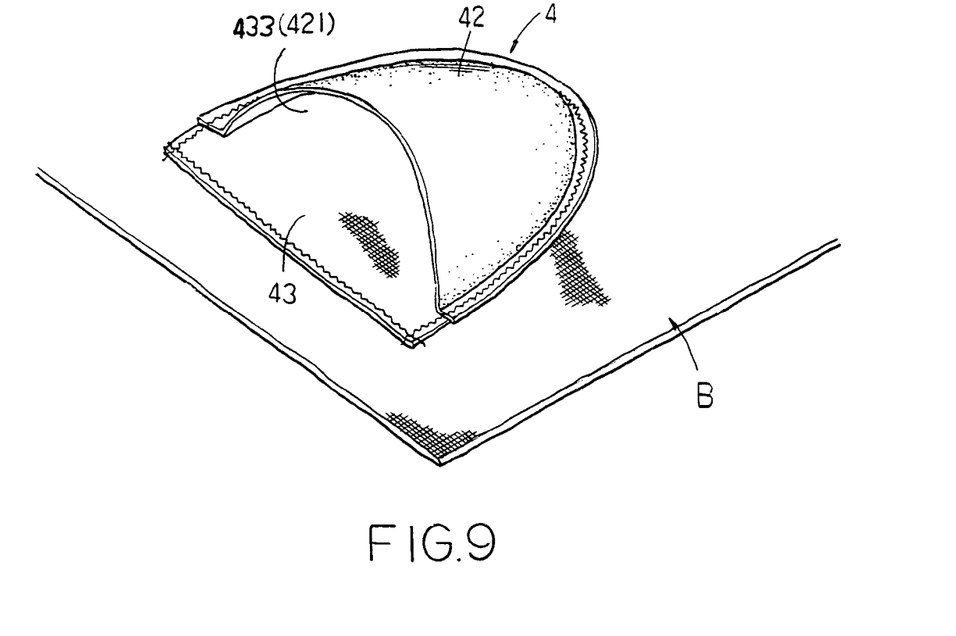
FIG. 9 is an assembled view of FIG. 8.
Figure 10:
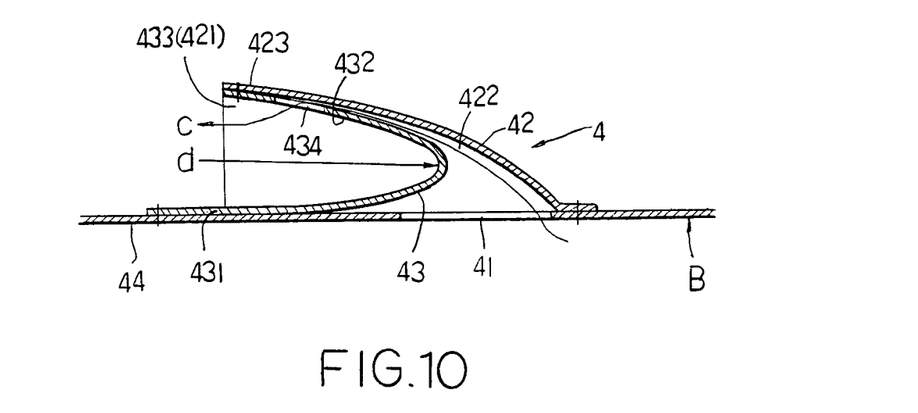
FIG. 10 is a sectioned side view of FIG. 9.

Please refer to FIG. 7 that is a schematic perspective view showing a motor vehicle (1), which is a boat in the drawing, is covered with a protective cover (B) of the present invention. The protective cover (B) is provided at predetermined positions with a plurality of venting structures (not shown). FIGS. 8, 9 and 10 are exploded perspective view, assembled perspective view, and sectioned side view, respectively, of one venting structure (4) of the plurality of venting structures. As shown the venting structure (4) mainly includes a vent (41) formed on the protective cover (B) at a desired position, such as an area corresponding to an engine (not shown) of the motor vehicle (1) being covered, a hood (42) and a substantially V-sectioned bag (43).

The hood (42) is generally made of a rigid or semi-rigid plastic material for locating outside and thereby shielding the vent (41). The hood (42) is fixed to the protective cover (B) by, for example, sewing at a lower edge of the hood (42) to areas surrounding three sides, including left, right and rear sides, of the vent (41), so that the hood (42) is located above the vent (41) like an arch with a wide hood opening (421) formed and maintained at a front side thereof and a clear airflow passage (422) defined between the hood (42) and the vent (41).

The V-sectioned bag (43) is designed for locating between the vent (41) and the hood (42). The V-sectioned bag (43) includes a bottom piece (431), which is fixed, for example, by sewing at an outer peripheral edge to the protective cover (B) near areas (44) at a front and two lateral sides of the vent (41), and a top piece (432), which is sewed at an upper front edge to a front edge (423) of the hood (42), such that an outward wide bag opening (433) is formed at a front side of the bag (43) to align with the hood opening (421). A plurality of through holes (434) are provided on the V-sectioned bag (43) close to the upper front edge of the top piece (432) to communicate the vent (41) with the bag opening (433). The V-sectioned bag (43) is made of a highly waterproof fabric or fully waterproof plastic sheet. All pinholes produced on the protective cover (B), the bag (43), and the hood (42) due to sewing are sealed with, for example, a waterproof tape (not shown) to ensure absolute watertightness of the protective cover (B).

When the protective cover (B) of the present invention is covered on a motor vehicle (1), any residual heat produced by the vehicle (1) and any moisture trapped in the protective cover (B) may escape via the vent (41), the airflow passage (422), the through holes (434), and the bag opening (433), as indicated by the arrow "c" in FIG. 10. On the other hand, external wind or rainwater is stopped by the V-sectioned bag (43) located between the vent (41) and the hood (42) from invading the protective cover (B), as indicated by the arrow "D" in FIG. 10. Since the through holes (434) are provided on the upper front edge of the bag (43) very close to the hood (42), it is uneasy for external rainwater to invade the protective cover (B) via the through holes (434). That is, the V-sectioned bag (43) functions like a check value to allow escaping of internal residual heat and moisture from the protective cover (B) via the vent (41) but not entering of external rainwater into the protective cover (B) via the vent (41). The protective cover (B) of the present invention is therefore completely watertight.

Figure 11:
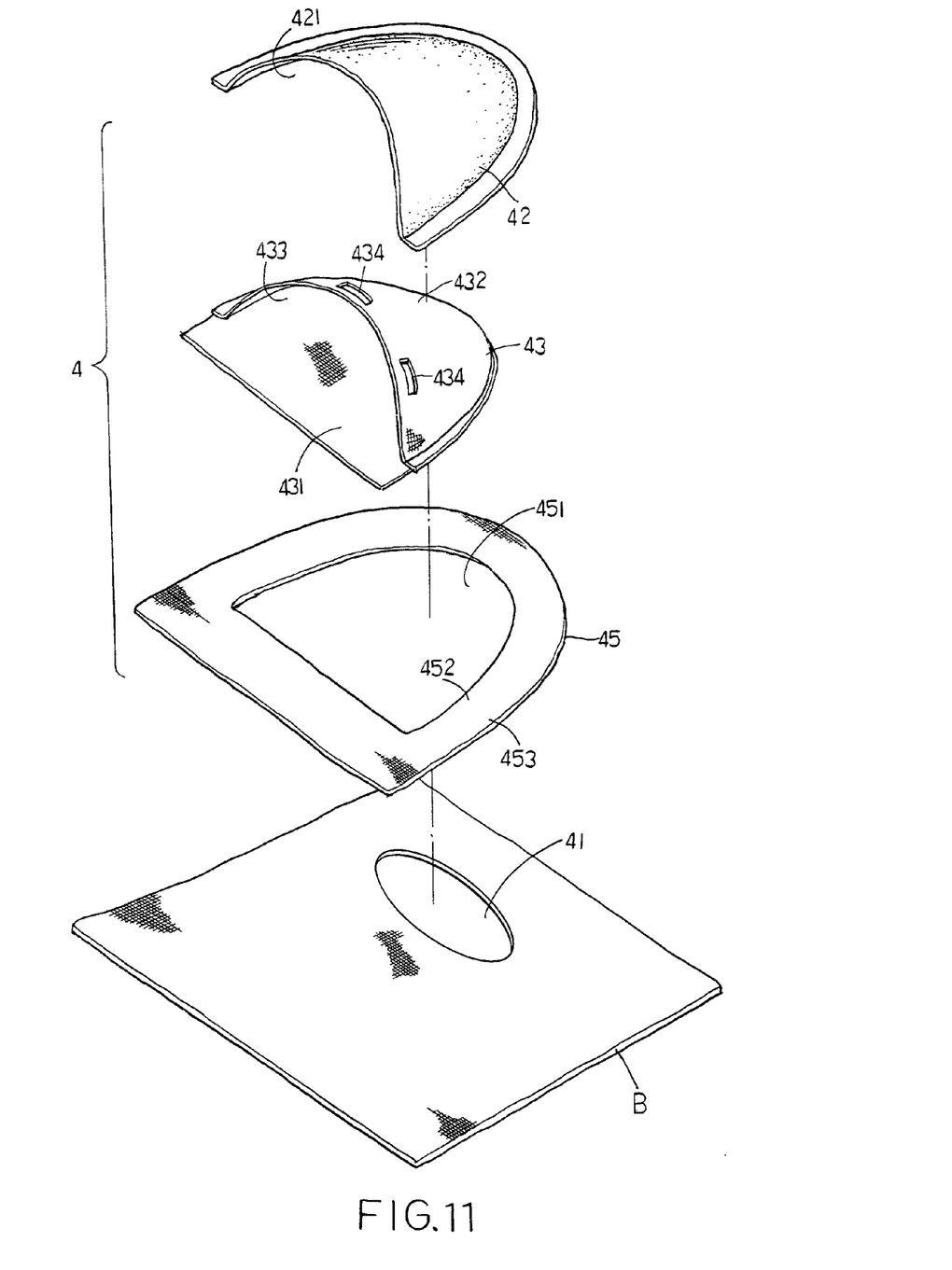
FIG. 11 is a fragmentary, enlarged, and exploded perspective view showing a second embodiment of the venting structure for the protective cover of the present invention.
Figure 12:
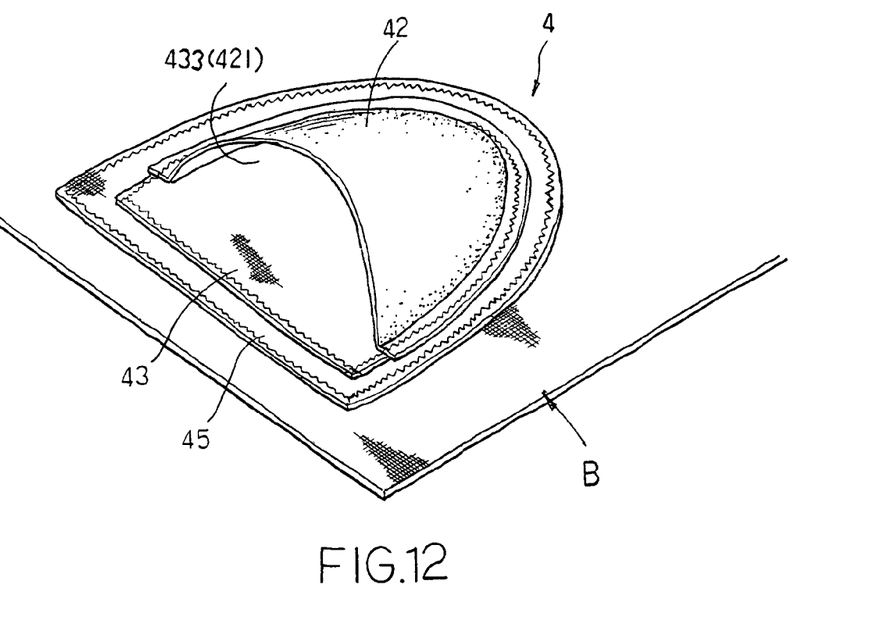
FIG. 12. is an assembled view of FIG. 11.
Figure 13:
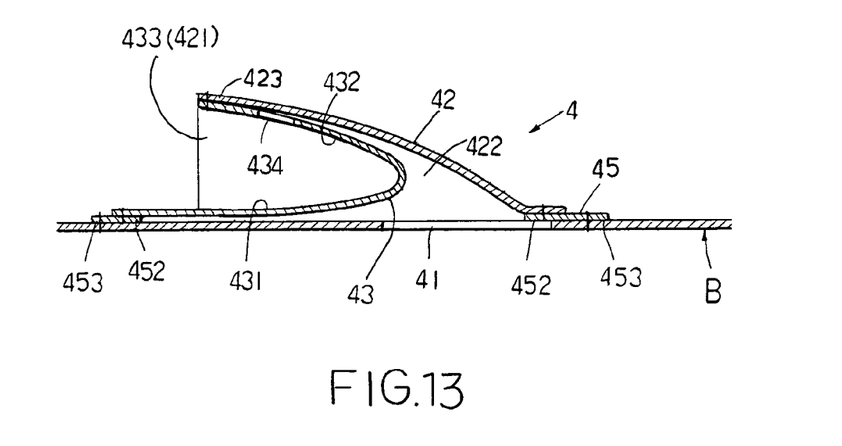
FIG. 13 is a sectioned side view of FIG. 12.

FIG. 11 is a fragmentary, enlarged, exploded perspective view of a second venting structure for the protective cover (B) of the present invention. FIGS. 12 and 13 are assembled and sectioned side views, respectively, of FIG. 11. As shown, the second venting structure is different from the first venting structure in that it further includes a fabric frame member (45) defining an internal opening (451) communicating with the vent (41). The V-sectioned bag (43) and hood (42) are sewed in the same manner as described above in the first venting structure to the fabric frame member (45) along an inner edge (452) adjacent to the internal opening (451) to form a module. The module is then attached to the protective cover (B) by sewing an outer edge (453) of the fabric frame member (45) to areas surrounding the vent (41). The second venting structure is not only functionally equivalent to the first venting structure, but also more convenient for use, because the module including the fabric frame member (45), the hood (42), and the V-sectioned bag (43) that are sewed together may be prepared in advance and ready for use at any time. To use the module of the second venting structure, simply sew it to the protective cover (B) at areas surrounding the vent (41). Pinholes produced on the protective cover (B) and the venting module due the sewing may be sealed with waterproof tapes.

Figure 14:
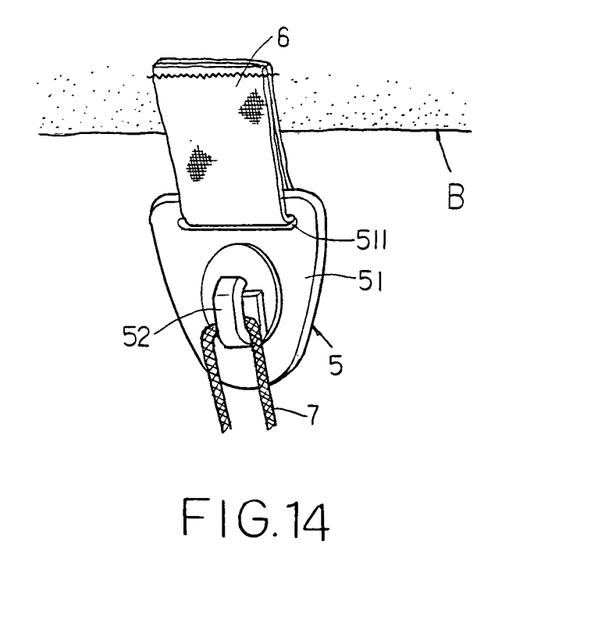
FIG. 14 is a fragmentary, enlarged, perspective view showing a fastening structure for the protective cover of the present invention.

Please refer to FIGS. 7 and 14 at the same time. The protective cover (B) is provided with a fastening structure that includes a plurality of fixing hooks (5) connected to a lower edge of the protective cover (B). Each of the fixing hooks (5) includes a plate portion (51) and a hook portion (52) provided on the surface of the plate portion (51) to extend upward. The plate portion (51) is also provided with a through hole (511) above the hook portion (52) for a tie-down loop (6) sewed to the lower edge of the protective cover (B) to extend therethrough and thereby connecting the fixing hook (5) to the protective cover (B). The hook portion (52) may be directly hooked onto the vehicle (1) or a trailer (8) supporting the vehicle (1) thereon. Alternatively, a rope (7) may be used to tie the hook portion (52) to the vehicle (1) or the trailer (8), so that the protective cover (B) is firmly tied to the vehicle (1) or the trailer (8) to cover the vehicle (1) without the risk of being blown away or lifted by strong wind. With the fixing hooks (5), the protective cover (B) may be conveniently handled to cover or remove from the vehicle (1).

In brief, the protective cover (B) of the present invention is provided with reliable waterproof venting structure and fastening structure, and is therefore very practical for use.

What is claimed is:

1. A protective cover for motor vehicle, comprising a venting structure that includes:
    at least one vent provided on said protective cover at a predetermined position;
    a hood located outside and thereby shielding said vent; said hood being fixed at near areas surrounding three sides of said vent, so that said hood is located above said vent like an arch with a wide hood opening formed and maintained at a front side thereof and a clear airflow passage defined between said hood and said vent; and
    a V-sectioned bag being designed for locating between said vent and said hood; said V-sectioned bag having an outward wide bag opening formed at a front side of said bag to align with said hood opening; and said V-sectioned bag being provided close to an upper front edge with a plurality of spaced through holes to communicate said vent with said bag opening.

2. The protective cover for motor vehicles as claimed in claim 1, wherein said V-sectioned bag includes a bottom piece, which is fixed along an outer peripheral edge to said protective cover near areas at a front and two lateral sides of said vent, and a top piece, which is fixed along an upper front edge to a front edge of said hood.

3. The protective cover for motor vehicles as claimed in claim 1, wherein said hood is made of a rigid or a semi-rigid plastic material.

4. The protective cover for motor vehicles as claimed in claim 1, wherein said hood is fixed to said protective cover by sewing the lower edge of said hood onto areas surrounding three sides of said vent.

5. The protective cover for motor vehicles as claimed in claim 2, wherein said V-sectioned bag is fixed to said protective cover by sewing the outer peripheral edge of said bag onto areas near the front and two lateral sides of said vent.

6. The protective cover for motor vehicles as claimed in claim 1, further comprising a fastening structure that includes a plurality of fixing hooks; each of said fixing hooks including a plate position and a hook portion provided on one surface of said plate portion to extend upward; said plate portion also being provided with a through hole above said hook portion for a tie-down loop sewed to the lower edge of the protective cover to extend therethrough.

7. A protective cover for motor vehicles, comprising a venting structure that includes:
    at least one vent provided on said protective cover at a predetermined position;
    a fabric frame member defining an internal opening communicating with said vent, and being attached to an outer edge to said protective cover close to areas surrounding said vent;
    a hood being fixed at a lower edge to said fabric frame member along an inner edge adjacent to three sides of said internal opening, so that said hood is located above said fabric frame member like an arch to shield said vent on said protective cover and said internal opening on said fabric frame member, and has a wide hood opening formed and maintained at a front side of said hood and a clear airflow passage defined between said hood and said vent; and
    a V-sectioned bag being designed for locating between said internal opening of said fabric frame member and said hood; said V-sectioned bag having an outward wide bag opening formed at a front side of said bag to align with said hood opening; and said V-sectioned bag being provided close to an upperfront edge with a plurality of through holes to communicates said vent with said bag opening.

8. The protective cover for motor vehicles as claimed in claim 7, wherein said V-sectioned bag includes a bottom piece, which is fixed at an outer peripheral edge to said fabric frame member along the inner edge adjacent to a front and two lateral sides of said internal opening of said fabric frame member, and a top piece, which is fixed along an upper front edge to a front edge of said hood.

9. The protective cover for motor vehicles as claimed in claim 7, wherein said hood is made of a rigid or a semi-rigid plastic material.

10. The protective cover for motor vehicles as claimed in claim 7, wherein said hood is fixed to said fabric frame member by sewing the lower edge of said hood onto said inner edge adjacent to said rear and lateral sides of said internal opening of said fabric frame member.

11. The protective cover for motor vehicles as claimed in claim 8, wherein said V-sectioned bag is fixed to said fabric frame member and said hood by sewing.

12. The protective cover for motor vehicles as claimed in claim 7, further comprising a fastening structure that includes a plurality of fixing hooks; each of said fixing hooks including a plate portion and a hook portion provided on one surface of said plate portion to extend upward; said plate portion also being provided with a through hole above said hook portion for tie-down loop sewed to the lower edge of the protective cover to extend therethrough.

* * * * *